March 6, 1934. P. DUNSHEATH 1,949,459
JOINT BETWEEN RELATIVELY MOVING MEMBERS ADAPTED
TO RESIST PLASTIC METAL UNDER PRESSURE
Filed Feb. 13, 1933 2 Sheets-Sheet 1
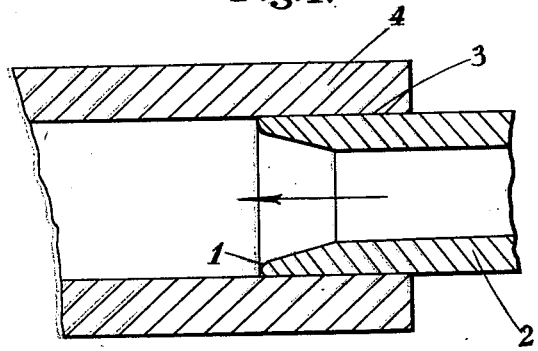
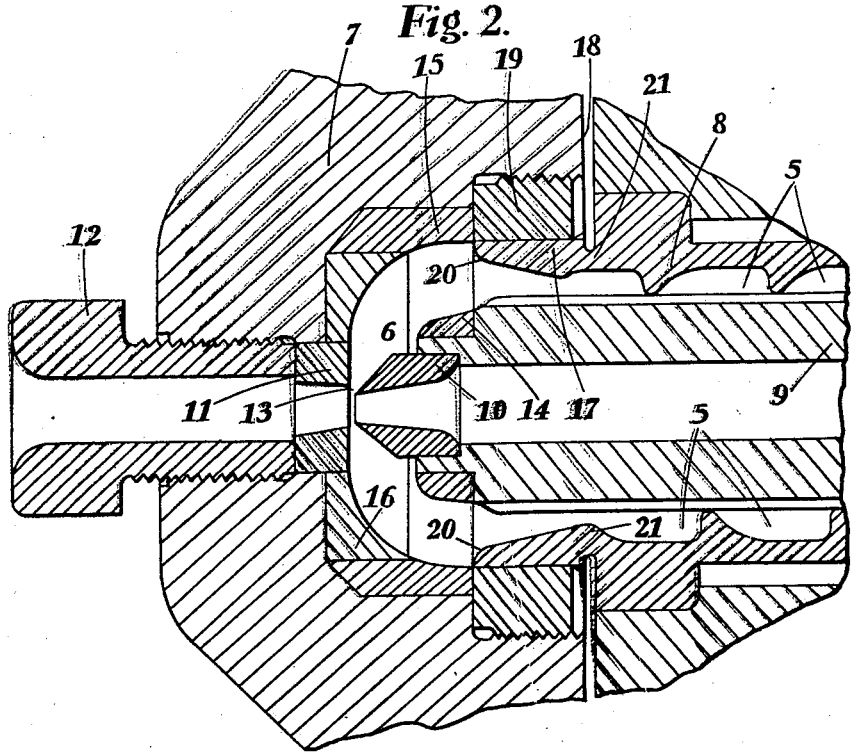
INVENTOR
Percy Dunsheath
BY
his ATTORNEYS

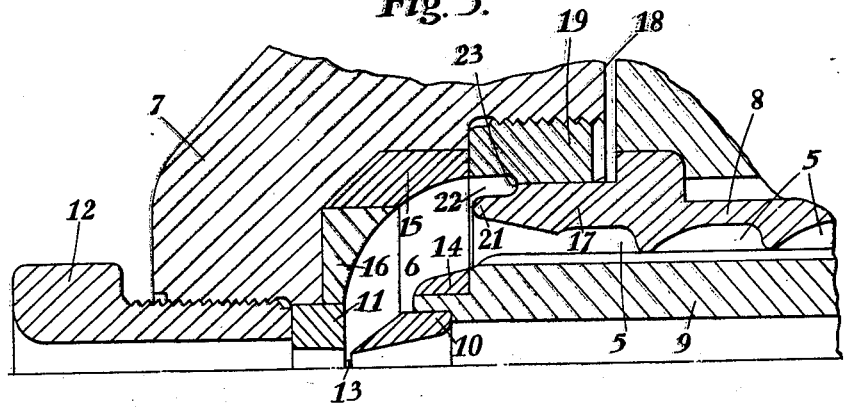
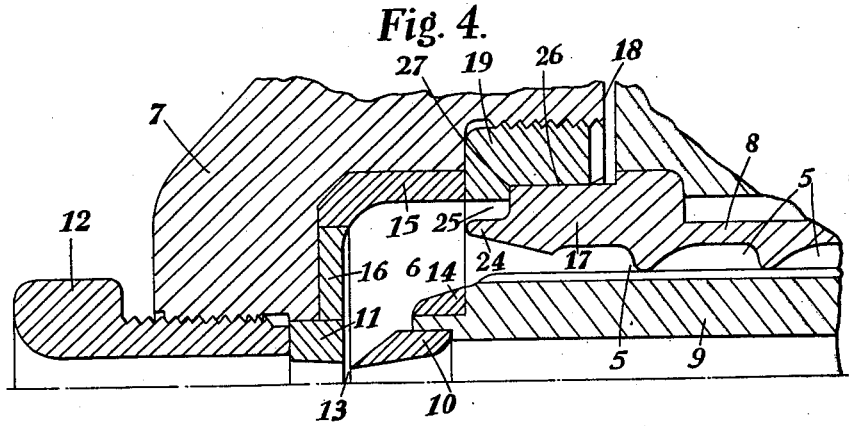
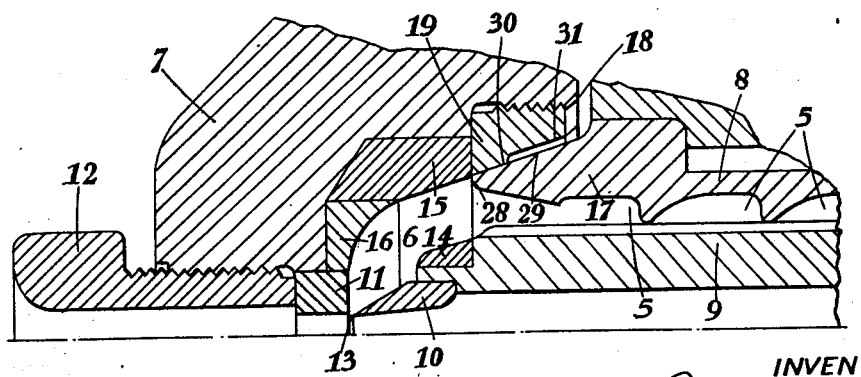

Patented Mar. 6, 1934

1,949,459

UNITED STATES PATENT OFFICE 1,949,459

JOINT BETWEEN RELATIVELY MOVING MEMBERS ADAPTED TO RESIST PLASTIC METAL UNDER PRESSURE

Percy Dunsheath, Kent, England, assignor to W. T. Henley's Telegraph Works Company Limited, London, England, a British company Application February 13, 1933, Serial No. 656,497
In Great Britain March 11, 1932

5 Claims. (Cl. 207—2)

This invention relates to joints between two relatively moving members which form wholly or partly one wall of a chamber through which metal in a highly viscous or plastic state is being impelled. The metal in the region of the joint is frequently under great pressure and, when this is so, considerable difficulty has been experienced in making a running joint capable of resisting such high pressures and preventing leakage therethrough of the metal.

It is the object of the present invention to provide a joint in which this difficulty is dealt with effectively and in accordance with the invention means are provided within the chamber to deflect the main flow of the metal which is being forced therethrough away from the jointed wall of the chamber in the vicinity of the joint. As a result, the edge of the joint which lies within the chamber is shielded from the main flow of the mass and the pressure exerted upon it is very considerably diminished. The deflecting means may consist of a ridge or wall, projecting into the chamber and located near the edge of the joint. This ridge or wall is provided or formed on or by the inner surface of that one of the two relatively moving members with which the metal first comes into contact (hereinafter referred to as the first member). It will be appreciated that the shielding effect of the deflecting means is obtained at a slow rate of flow because the metal is in a very viscous state.

Preferably the joint surface will extend from its inner edge in a direction rearwards relative to the main direction of flow of the metal through the chamber of which the shape may vary considerably. The chamber may be of tubular form of circular or other cross-section and the two relatively moving members jointly may wholly form the circular or other section wall as in the case of a chamber formed of two members, or partly form the circular or other section wall as in the case of a chamber constructed of more than two members. If the chamber is of circular cross-section, the relative movement may be a rotational one. If the chamber is cylindrical, prismatic or other appropriate form the relative movement between the constituent members may be a linear one parallel with the main direction of flow of metal. If in the same direction as that of the flow, it must be relatively slow to avoid the production of eddies. A movement of this type may take place in an expansion joint placed in the wall of a long chamber. Whether the movement be rotational or linear, one of the members, preferably the first may be formed with a spigot end projecting into a corresponding socket of the second member as illustrated in Figure 1 of the accompanying drawings. In this example of construction the end wall 1 of the cylindrical spigot member 2 forms the necessary shield. The joint surface 3 between the member 2 and the socketed member 4 is cylindrical and extends rearwards relative to the main direction of flow of the metal which is in the direction indicated by the arrow.

In cases where the chamber is of annular form, the relatively moving members may jointly form either an outer wall of the chamber, in which case it is, as previously stated, preferred to make the first member a spigot member, or an inner wall of the chamber. In the latter case it is preferred to provide the second member with a spigot end fitting in a socket end in the first member.

The invention is particularly, though not exclusively applicable to apparatus for the extrusion of metal in which a screw-thread impelling device drives the metal forward in the extrusion chamber to and through the die, or between an inner die and an outer die. In such apparatus the metal is fed in the molten state to one end of the impelling device and is then subjected to cooling so that it acquires sufficient rigidity to cooperate mechanically with the screw thread of the impelling device. In effect, there is continuously cast, in or on the screw thread, a cylinder or tube having a corresponding thread and this body is driven forward continuously by the continuous movement of the rotary part of the impelling device resulting in continuous delivery of metal in the plastic state to the extrusion chamber and in extrusion of it by the pressure exerted on it by the following metal.

The way in which the invention may be applied to one form of such extrusion apparatus will be described by way of example with reference to Figures 2–5 of the accompanying drawings which show fragmental longitudinal cross-sections of such apparatus and illustrate several forms of construction in accordance with the invention of the running joint between a rotating part of the impelling device and a fixed part of the extrusion chamber. Referring now to the drawings, the apparatus is formed as an annular chamber 5 into one end of which (not shown) the molten metal is fed by gravity, and from the other end 6 of which the metal is extruded. The rear end and the front end 7 of the chamber are fixed and the central portion is formed by a rotating part 8 of the impelling device, which makes running joints with the fixed ends of the chamber. A non-rotating central core 9 is provided extending throughout the whole length of the chamber and carrying an inner die 10 at the extrusion end. An outer die 11, positioned in the end wall 7 of the chamber by the nut 12, co-operates with the inner die to provide an annular space 13 of appropriate form and dimensions for the passage of the extruded metal. To maintain the inner die in correct alignment it is supported by a bearing 14 carried by three radial bridge pieces which are not shown in the drawings but which extend from a ring shaped insertion piece 15 forming part of the wall of the chamber. The part of the chamber wall between this piece 15 and the outer die 11 is also formed by an insertion piece 16. In the neighbourhood of the running joint between the central part 8, which corresponds to the first of the two relatively moving members mentioned above and the fixed part forming the end of the extrusion chamber and corresponding to the second of the two members, the metal is very viscous. Flow is produced only as a result of the high pressure exerted on the metal. The pressure may be of the order of two tons per square inch in some cases but may be less or greater than this, depending upon the design of machine, temperature of extrusion and upon the type of metal or alloy being extruded. It has been found that when the inner surface of the forward end part of the member 8 is made flush with that of the extrusion chamber 6 an effective joint between the relatively moving parts is difficult of attainment. In applying the present invention to this joint, the forward end of the rotating part 8 of the impelling device is preferably formed as a spigot 17 concentric with the axis of rotation of the member 8. The adjacent end wall 18 of the part 7 is then recessed to receive an externally screw threaded bushing 19, in which the spigot 17 is rotatably housed. Various modifications in the precise shape of the spigot and the position of the running joint may be made and Figures 2-5 inclusive each show, as an example, a slightly different form of construction. In all the examples it will be observed that the internal diameter of the inner end of the spigot 17 is less than that of the fixed part of the chamber, that is to say, of the ring shaped piece 15.

Referring now only to Figure 2 it will be seen that in the form illustrated therein the outer surface of the spigot 17 is cylindrical whilst the inner surface is conical to give a satisfactorily shaped inlet to the extrusion forming chamber 6. The end of the spigot 17 is blunt and the surface thereof makes an angle of substantially 90° with the fixed wall of the chamber. The edge between this end surface and the internal surface of the spigot is rounded off as shown at 20. The end of the spigot thus shields the inner edge of the running joint from the main flow of the metal forced into the chamber 6 by the impeller 8. It will be observed that the joint surface, being cylindrical and concentric with the axis of the machine, extends from the shielded inner edge in a direction rearwards relative to that of the main flow of the metal. In order to render the joint flexible the spigot 17 is necked as at 21. This permits the forward end of the spigot more readily to be elastically deformed under the influence of the pressure of the lead in the annulus between the spigot and the member 9 and consequently assists in the maintenance of a close joint.

In the example of running joint shown in Figure 3 the joint, which again is cylindrical and concentric with the axis of the machine, lies in a position more remote from the main flow of the metal. The inner edge 23 of the running joint is set back from the forward edge 21 of the spigot 17, this being effected by cutting away parts of the joint surfaces on the bush and spigot at their forward ends to form the annular recess 22. In this case the forward edge of the spigot is rounded internally and externally as shown at 21.

In the joint shown in Figure 4, the joint is again set back relative to the rounded end 24 of the spigot but in this case the annular recess 25 is entirely formed by making the forward portion of the spigot of reduced diameter. At the same time the member 19 is recessed on its rear side, the cylindrical wall 26 of the recess forming the outer surface of the running joint. As a result the inner edge of the running joint 26 is separated from the annular recess 25 by the additional joint 27, and is still more removed from the main flow of the metal.

The running joint shown in Figure 5 is very similar to that shown in Figure 2 in that the entrance to the joint is level with and is shielded by the rounded end 28 of the spigot 17, but differs in that the outer surface 29 of the spigot 17 is conical and is supported by the correspondingly shaped bearing surface 30 of the bushing 19. To reduce friction the rear part of the inner conical surface on the member 19 is cut away as at 31.

In other extrusion apparatus of this type the outer member of the impelling device may be stationary and the inner member may rotate or both these members may rotate, the rotations being in opposite senses. In each of these cases the core may be hollow as illustrated in Figures 2-5 of the drawings to serve for the passage of an electric cable when the machine is being used for sheathing cables. In those cases where the central core rotates and is hollow and it is necessary to support it at its front end, the support may be a fixed stationary inner die, the rear end of which makes a running joint with the hollow core. The edge of the joint within the chamber will normally be under full pressure; its outer edge adjacent the cable will not be so. The invention can be beneficially applied to such joint to diminish this pressure difference and can in fact usually be applied with advantage to any running joint where only one edge of the joint is subjected to the pressure of the flowing plastic metal.

What I claim as my invention and desire to secure by Letters Patent is:—

1. A chamber through which under working conditions metal in a highly viscous or plastic state is impelled, comprising a fixed member forming one part of one wall of the said chamber, a second member forming another part of that wall and capable of moving relative to the first said member and making a running joint therewith over and past which the metal flows, and means, located in proximity to the inner edge of said joint, to deflect the main flow of the metal which is being forced through the chamber away from the inner edge of the said running joint.

2. A chamber through which under working conditions metal in a highly viscous or plastic state is impelled, comprising a fixed member forming one part of the wall of the said chamber, a second member forming an adjacent part of that wall and capable of moving relative to the first said member and making a running joint therewith over and past which the metal flows, and means for deflecting the main flow of the metal which is being forced through the chamber away from the inner edge of said running joint, said means consisting of a ridge, projecting into the chamber and located in proximity to the edge of the said running joint, provided on the inner surface of that one of the two said members with which the metal first comes into contact in its path through the chamber.

3. A chamber through which under working conditions metal in a highly viscous or plastic state is impelled, comprising a fixed member forming one part of one wall of the said chamber, a second member forming an adjacent part of that wall and capable of movement relative to the first said member and making a running joint therewith over and past which the metal flows and of which the joint surface extends in a direction rearwards relative to the main flow of the metal through the chamber, and means located in proximity to the inner edge of the said running joint for deflecting the main flow of the metal which is being forced through the chamber away from the inner edge of the said running joint.

4. A tubular chamber through which under working conditions metal in a highly viscous or plastic state is impelled, comprising two relatively movable members together forming a part of the wall of the said chamber, a spigot on that one of the said members with which the metal first comes into contact in its path through the chamber, a socket on the other of the said members for receiving the said spigot and making a running joint therewith, and a ridge, provided by the end wall of the spigot and projecting into the chamber, to deflect the main flow of the metal through the chamber away from the inner edge of the said running joint.

5. In apparatus for the extrusion of metal in plastic form in which a screw-threaded impelling device drives the metal forward through an annular chamber of which one wall is formed partly by a rotating part of the impelling device and partly by a fixed member, a spigot on the forward end of the said rotating part concentric with the axis thereof, the said spigot entering the rear end of the said fixed member and making a running joint therewith, having at its forward end in proximity to the inner edge of the said joint an internal diameter less than that of the fixed part of the wall of the chamber adjacent to it, and having that part of its end surface which projects into the chamber appropriately curved to shield the inner edge of the said running joint from the main flow of metal.

PERCY DUNSHEATH.